A. N. STIMSON.
CLUTCH PULLEY.
APPLICATION FILED JAN. 25, 1911.
1,004,928.
Patented Oct. 3, 1911.
2 SHEETS—SHEET 1.
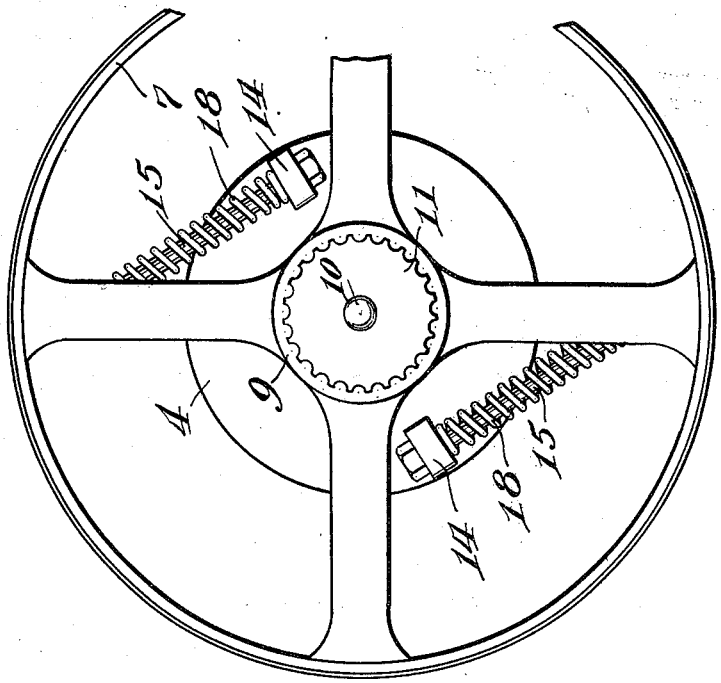
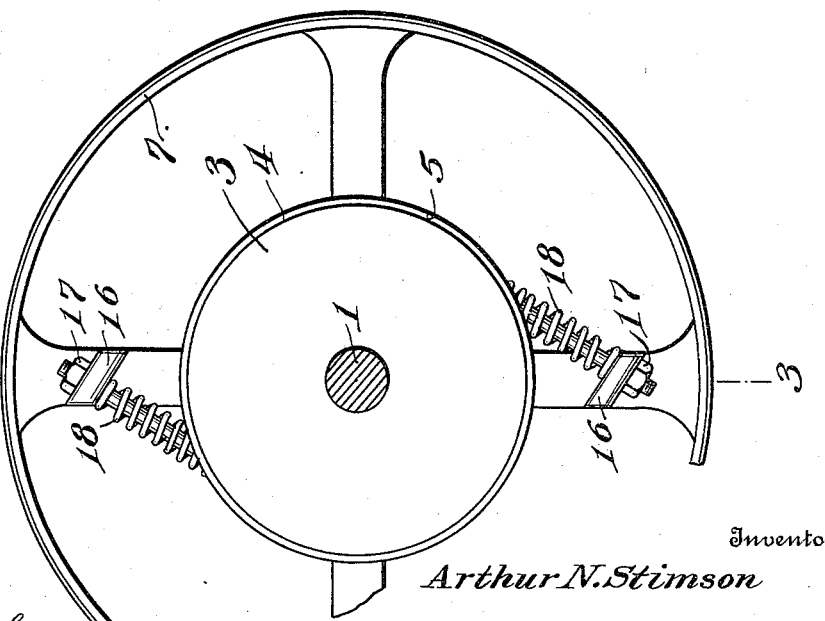
Witnesses
H. H. Lybrand
Inventor
Arthur N. Stimson
By Victor J. Evans
Attorney
COLUMBIA PLANOGRAPH CO., WASHINGTON, D. C.

A. N. STIMSON.
CLUTCH PULLEY.
APPLICATION FILED JAN. 25, 1911.
1,004,928.
Patented Oct. 3, 1911.
2 SHEETS—SHEET 2.
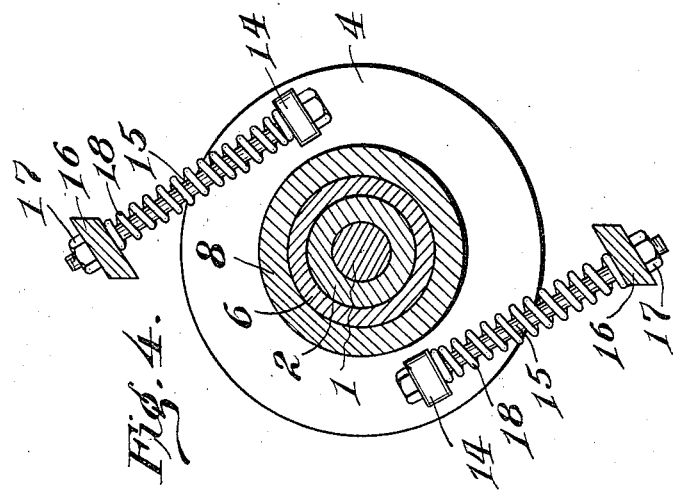
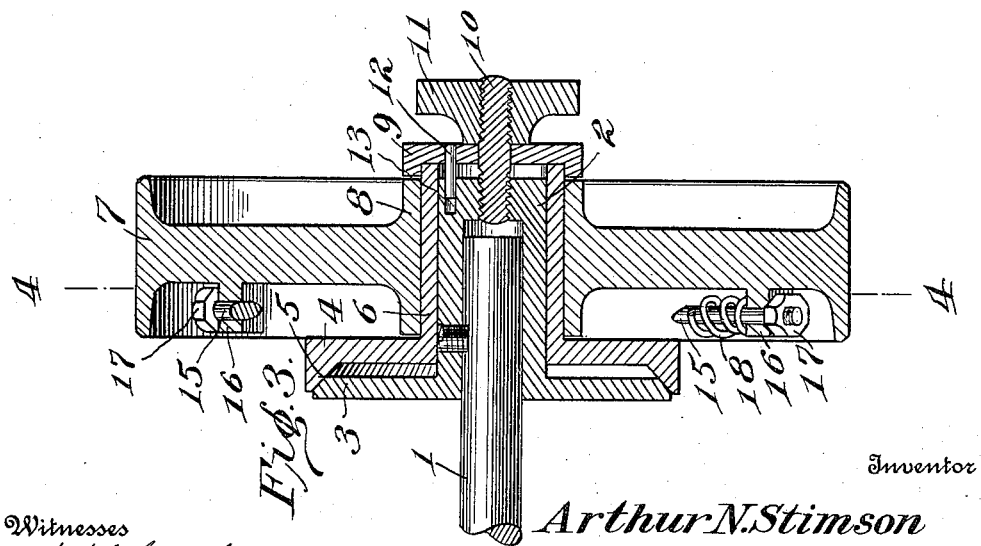
Witnesses
H. H. Lybrand
Inventor
Arthur N. Stimson
By Victor J. Evans
Attorney

UNITED STATES PATENT OFFICE.

ARTHUR N. STIMSON, OF WATERLOO, IOWA.

CLUTCH-PULLEY.

1,004,928.  Specification of Letters Patent.  Patented Oct. 3, 1911.

Application filed January 25, 1911.  Serial No. 604,609.

*To all whom it may concern:*

Be it known that I, ARTHUR N. STIMSON, residing at Waterloo, in the county of Blackhawk and State of Iowa, have invented new and useful Improvements in Clutch-Pulleys, of which the following is a specification.

This invention relates to pulleys and more particularly to clutch pulleys.

The object of the invention is the provision of means in a pulley of this type to relieve the shaft of the continuous shocks imparted thereto by the belt or other connecting device when the pulley is used in connection with a gas engine, or other internal combustion engine, or in any place where the power is applied intermittently as distinguished from the continuous application of power as in steam engines.

Further objects of the invention will appear as the following specific description is read in connection with the accompanying drawings, which form a part of this specification, and in which:

Figure 1 is a front elevation. Fig. 2 is a rear elevation. Fig. 3 is a vertical section taken on the line 3—3 of Fig. 1, and Fig. 4 is a similar section taken on the line 4—4 of Fig. 3.

In the present instance, the application of the device has been illustrated in connection with the shaft 1 of a centrifugal cream separator. Keyed to the shaft 1 is a clutch sleeve 2 having a beveled faced clutch disk 3 which is engaged by a clutch disk 4 having a similar beveled face 5 and carried upon a similar sleeve 6 which is loosely mounted upon the sleeve 2. The pulley proper, is shown at 7 with its hub 8 loosely mounted upon the sleeve 6 and held in position thereon by a washer 9 which is mounted upon a projecting screw 10 threaded into the end of the sleeve 2. The washer is held in adjustable relation with the end of the sleeve 2 by a set screw 11 and is caused to rotate with the sleeve 2 by means of a pin 12 which freely enters a socket 13 in the end of said sleeve. It will be noticed that the end of the sleeve 2 does not contact with the inner face of the washer 9, but the flanged periphery of said washer engages the hub of the pulley 7 and the inner face of said washer is contacted by the end of the sleeve 6. When the set screw is tightened, the two clutch members 3 and 4 will be pulled together and held in locked relation, against a predetermined amount of pressure. The pulley 7, however, is free to turn around upon the sleeve 6, between the disk 4 and the washer 9.

Projecting laterally from the inside face of the disk 4 are suitable lugs 14 which are apertured to receive connecting rods 15 whose opposite ends are passed through alining apertures in lugs 16 projecting from the spokes of the pulley 7. These rods have suitable nuts 17 upon their ends and are free to move through the apertures in the lugs. They are arranged diagonally to the spokes and have surrounding them the coiled springs 18 whose tension is adjusted by the nuts 17.

From the foregoing, it will be seen that when any sudden strain is applied to the pulley, it will rotate upon the sleeve 6 and the springs 18 will be compressed until the pressure of the springs overcomes the load or until such strain is relieved. The intermittent jerky motion of the ordinary gas engine, will not therefore, be imparted to the shaft 1 except in a minimized degree. If the strain is excessive or beyond the capacity of the springs, the clutch faces will slide one upon the other until the strain is removed. This action may be regulated by manipulating the set screw 11.

Having thus described my invention, what is claimed, is—

1. In combination with a driven shaft, a clutch member keyed thereto, a second clutch member frictionally held in engagement with the first clutch member, and a pulley mounted on the second clutch member and resiliently connected thereto.

2. In combination with a driven shaft, a clutch member keyed thereto, a second clutch member mounted upon the first clutch member, means for adjustably holding the second clutch member into engagement with the first clutch member, a pulley mounted on the second clutch member, and a resilient connection between the second clutch member and the pulley.

3. The combination with a driven shaft, of a clutch member keyed thereon, a second clutch member mounted upon the first clutch member, a pulley mounted upon the second clutch member, a resilient connection between the pulley and the second clutch member, and means for holding the pulley in position upon the second clutch member, and for adjusting the engagement of the first clutch member with the second clutch member.

In testimony whereof I affix my signature in presence of two witnesses.

ARTHUR N. STIMSON.

Witnesses:
   E. M. STIMSON,
   MARK IRVINE.

Copies of this patent may be obtained for five cents each, by addressing the "Commissioner of Patents, Washington, D. C."